April 1, 1930. J. J. RISDON 1,752,458
PHOTOGRAPHIC PRINTER
Filed Sept. 20, 1927 3 Sheets-Sheet 1
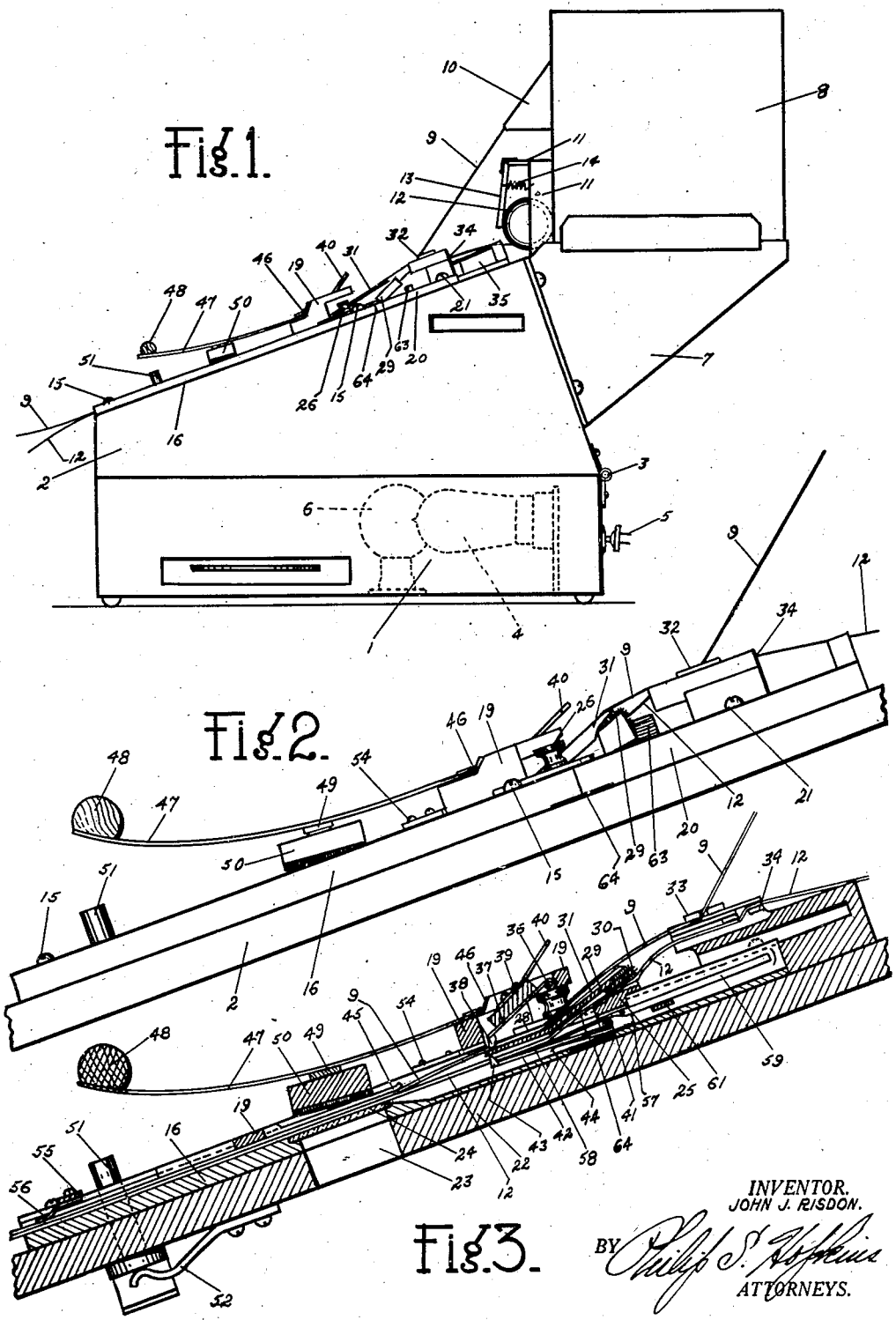
INVENTOR.
JOHN J. RISDON.
BY
ATTORNEYS.

Patented Apr. 1, 1930

1,752,458

UNITED STATES PATENT OFFICE

JOHN J. RISDON, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK

PHOTOGRAPHIC PRINTER

Application filed September 20, 1927. Serial No. 220,788.

My invention pertains to an apparatus for printing photographic images and is especially adaptable to the printing of a strip of positives from a strip of negatives, such as for instance, motion picture film, or sections thereof.

There is in general use today a type of hand camera for making "still" pictures which utilizes short lengths of perforated motion picture film as the sensitized medium upon which the images are formed. After development, this strip of negatives may be printed on a second strip of positive film or paper as desired. My improved printer is designed particularly for printing such positives.

In the use of the above mentioned type of hand camera, it frequently occurs that due to the relative position of the film shifting device with respect to the film in different cameras, the images which are photographed on the negative film vary with respect to the perforations of the films. Obviously therefore, such variations must be compensated for in some way so that the resulting positive strip printed from a given negative will have its frames or images properly positioned with respect to the film shifter of the projector through which the positive strip will subsequently be run in order to project the pictures to a screen. I propose to compensate for this variation in my improved printer and one of the principal objects of my invention is to provide an adjusting means whereby at the time of the printing operation of a given strip, the frames of the negative strip may be properly adjusted for printing on the positive film at uniformly spaced intervals and also in proper relation to the perforations on the positive strip.

Another object of my invention is to provide a novel form of film shifting mechanism for the negative and positive strips.

A still further object lies in the provision of means for omitting the printing of any desired frame or image of the negative film without disturbing the continuity of printed images on the positive strip.

A further object resides in the novel arrangement for film guides and tensioning devices whereby accurate and positive feeding of the strips through the printer is insured.

Another and important object is to provide an adjusting means which will permit the proper framing of the negative images with respect to the exposure opening in order to take care of variation in spaces between the images without interfering with the uniform spacing on the positive strip.

Other objects and advantages in detail of construction and operation will be apparent as the description proceeds, reference now being had to the accompanying drawings wherein like reference numerals indicate like parts.

In the drawings Figure 1 is a side view of my improved printing apparatus.

Figure 2 is a detailed side view of the shifting mechanism.

Figure 3 is a detailed cross sectional view taken on the line 3—3 of Figure 4.

Figure 4:
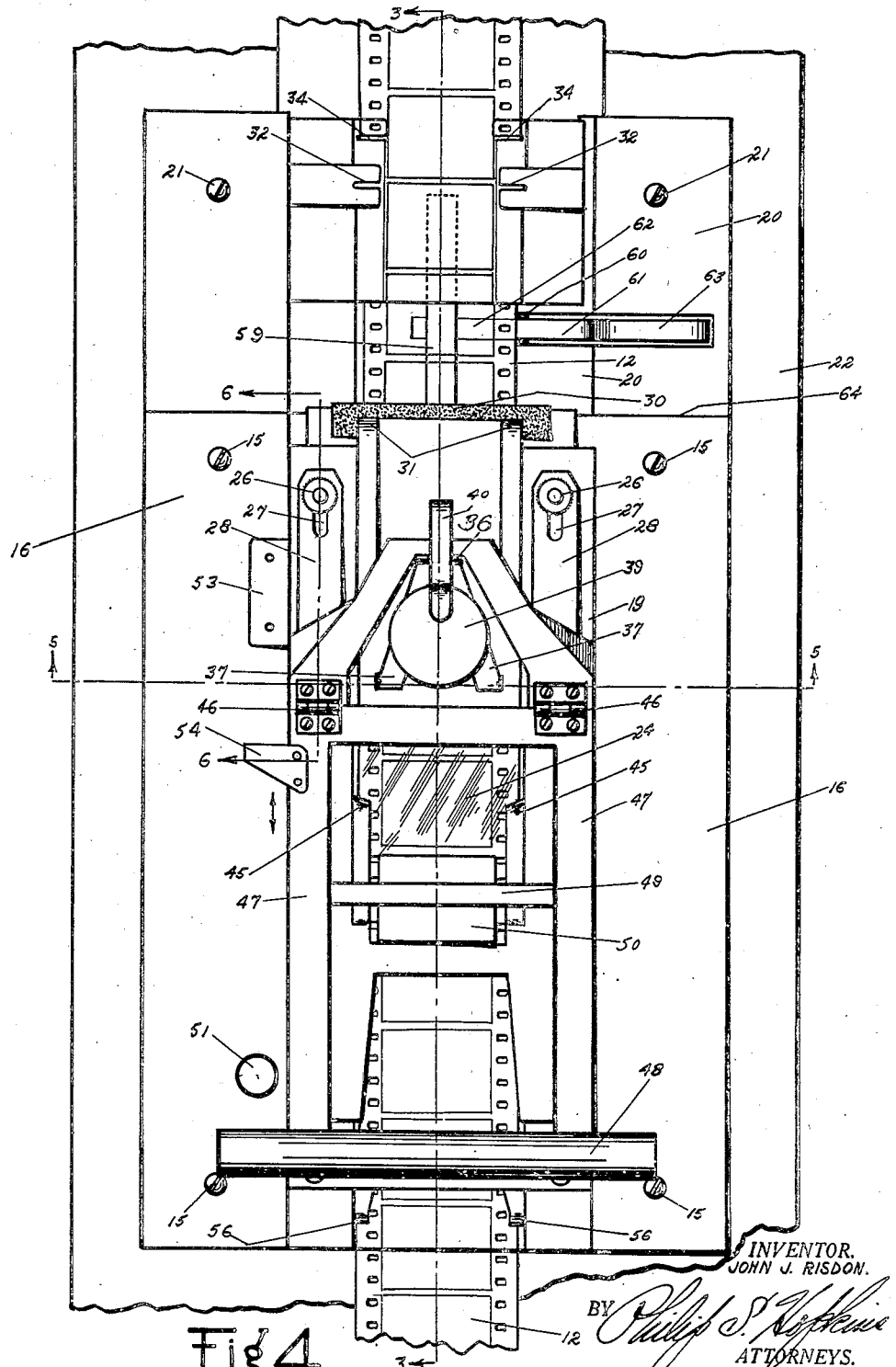
Figure 4 is a top plan view of the film shifting mechanism.

In carrying out my invention, I provide a casing 1, the upper half 2 of which is hinged as at 3, whereby access may be had to the printing lamp 4, receiving its current from any suitable source of electricity through the contact number 5, and the usual red or safe light 6, also located within the casing 1 and which may be continuously lighted when the printer is in use.

To the rear side of the hinged section 2 of the casing and adjacent to the upper edge thereof is secured a bracket 7 on top of which is removably mounted a film magazine 8, containing a roll of sensitized positive film or paper 9, (in this instance film), the same being fed from the magazine through the spout 10, to working position. Directly beneath the spout 10 are projecting flanges 11, providing a holder for a coil of negative film 12 resiliently held in position between the flanges by means of a hinged flap 13 and coil spring 14, said flap bearing against the roll of negative film to retain it between the flanges 11 but permitting the free rotation thereof as the film is drawn through the printer in a manner to be described.

Figure 5:
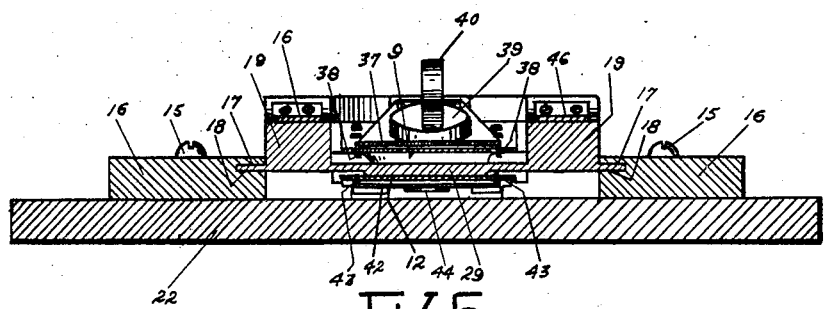
Figure 5 is a detailed cross sectional view taken on the line 5—5 of Figure 4.

Secured to the sloping top surface of the hinged section 2, as by the screws 15, is a guide member 16 consisting of spaced strips shown clearly in Figure 5, the inner edges of which are provided with grooves 17 adapted to receive the tongues 18 projecting laterally from the side edges of a slide 19. The guide member 16 is provided at its upper end with an extension 20 secured as by screws 21 to the top of the hinged section 2, which extension is hinged to the end of the guide 16. The purpose of this extension will be described later.

The top wall of the hinged section 2 is shown clearly in Figure 3 at 22, and there is provided in this wall an opening or window 23 through which the light from the lamps 4 and 6, may pass upwardly. The opening 23 is closed at its upper side by the transparency 24. The size of this opening 23 is preferably exactly the size of the frames of the images to be printed.

Figure 6:
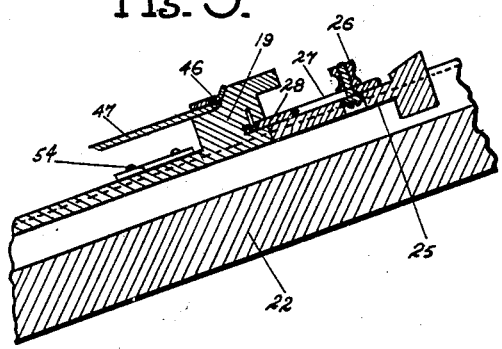
Figure 6 is a detailed cross section taken on the line 6—6 of Figure 4.

The slide 19 is provided with an adjustable extension 25 (shown clearly in Figure 6), such extension being adjustably secured to the slide 19 by means of set screws 26 carried by the extension 25 and passing through the slots 27 in arms 28 suitably fastened to the slide 19. Obviously therefore, the extension 25 may be adjusted longitudinally with respect to the slide 19 and locked in such adjusted position whereby upon the movement of the slide 19 the extension will move therewith.

The extension 25 has suitably secured thereto a film guide member 29 the outer end of which is adapted to receive the negative film 9 as it is fed through the apparatus. This film guide 29 is provided with a strip 30 of velvet or other suitable material to prevent scratching the film as the same passes into and through the guide.

Carried by the slide 19 and over-lying the film guide 25 is a second film guide 31 over which is adapted to pass the strip of positive film 12.

Beyond the end of the adjustable extension 25 and slidable in the guideway extension 20 is an independent film guiding device indicated generally at 32 and comprising an upper film guide 33 for the positive film and a lower film guide 34 for the negative film. Thus, as the strips of negative and positive film 9 and 12 respectively are pulled out of the film magazine, they are properly guided in spaced relation, the positive directly above the negative, down to a point substantially at the exposing window 23, whereby any relative movement between the films will not cause one to scratch or rub the other. The film guides 33 and 34 just described are merely notches through which the film strips are threaded in order to keep them in proper alignment for feeding to and beneath the slide member 19. It will be observed with reference to Figure 1 that the film guide member 32 is cut away as at 35 to provide a space under the negative film 9 whereby the operator may insert his forefinger, which together with the thumb on top of the negative strip affords a ready and convenient means for manipulating the film while threading the same in the printer.

Pivoted to the slide member 19 as at 36 is a film claw shifting device 37 provided at its free end with the film perforation engaging teeth 38 and on its top side with a weight 39 and finger piece 40. The front edges of the teeth 38 are straight as shown clearly in Figure 3 whereby upon movement to the left in Figure 3 of the slide member 19, such teeth will engage with the perforation in the positive film 12 and cause such film to be moved in accordance with the movement of the slide. The rear edges of the teeth, however, are bevelled whereby upon the return movement of the slide to the right, the claw will ride over the film until the movement stops whereupon the teeth again drop into the film perforations. The weight 39 normally holds the claw in engagement with the film 12.

Pivoted to the under side of the extension 25 as at 41 is a second claw, the free end of which is provided with teeth 43 normally forced upwardly into engagement with the perforations in the negative film 9, by means of a leaf spring 44. Obviously then, the movement of the slide 19 to the left in Figure 3 also results in the movement in the same direction of the negative film, being pulled by engagement of the straight front edges of the teeth 43 engaging in the perforations of said film. Likewise, upon the return movement to the right of the slide 19 the opposite bevelled edges of the teeth 43 will ride along the under surface of the film. It will be noted with reference to Figure 3 that the film guide 29 extends between the claw members 37 and 42, thus eliminating any danger of either the teeth 38 or 43 passing through their respective films and engaging the perforations of the other.

The slide 19 is provided with the film guide 45 beneath which both the negative and positive film strips pass in engagement with each other and over the transparency 24 in the exposure opening 23. Therefore at the point of exposure the two films are in contact with each other, the negative film being directly beneath the positive.

Pivoted at 46 on the slide 19 is an operating member 47 provided with a hand grip 48 at its free end and consisting of resilient strips normally turning upward away from the slide. Centrally of these strips is a cross piece 49 to which is secured a presser pad 50 which when the slide 19 is shifted to the limit of its movement to the right in Figure 3 directly overlies the exposure opening 23 and the film strips thereon. This is the printing position and upon downward pressure on the hand grip 48 the presser pad engages and holds the two films in perfect contact with each other for the printing operation. This downward pressure on the member 48 at this point likewise depresses the plunger 51, over which the handle 48 lies when the slide is shifted to the right, this plunger 51 closing the contact number 52 and lighting the printing light 4 within the casing. As soon as pressure is released upon the handle 48 the resilient strips 47 again raise away from the slide thus automatically opening the electric circuit to the lamp and relieving the pressure of the pad 50 on the film strips. From this upward position the slide 19 is now pulled to the left in Figure 3 by means of the handle 48, upon which movement the claws 37 and 42 act to shift the film strips together to bring the next image or frame on the negative film 9 and the next unexposed frame of the positive film 12 over the printing opening 23 whereupon the printing operation just described is repeated.

Fixed to the guideway 16 is a stop member 53 properly positioned with respect to the slide 19 whereby the lug 54 secured to such slide will engage with said stop member and thus limit the upward movement, or movement to the right in Figure 3, of the slide. The downward movement of the slide is limited by the extreme lower end thereof engaging against a fixed stop 55 secured to the guide member 16 in the path of the slide 19. It will be noted also with reference to Figure 3 that secured to this stop member 55 are spring tension members 56 beneath which the film strips 9 and 12 pass as they leave the slide. This tension tends to prevent inadvertent or accidental movement of the film strips.

The operation of my invention is as follows:

A roll of negative film is placed in proper position between the flanges 11 and under the flap 13 from which it may be easily withdrawn, and the free end thereof passed first through the film guide 34 directly ahead of which the film overlies the recess 35 whereby the film may be readily grasped by the operator for moving the same downwardly. After leaving the guide 34 the film is threaded through the guide 29 adjacent to the inner end of which it is engaged by the teeth 43 of the bottom claw 42. Movement of the negative film strip by hand may be continued now, the perforations riding over the bevelled edges of the teeth 43 until the film passes over the transparent window 24 overlying the exposure opening 23. At this point the film passes under the guide 45. If desired the slide 19 may now be operated, that is, pulled to the left in Figure 3, which will result in the claw 42 moving the negative film over the exposure opening 23. When the first frame or image on the negative film overlies the opening 23, with the slide pulled downwardly or to the left to the limit of its stroke, the set screws 26 should be loosened to permit relative adjustment between the slide 19 and the extension 25 thereof. With the slide 19 now held firmly in its lowermost position, the operator may grasp the negative film at the recess 35 and by pulling backward upon the film adjust such first image or frame to be printed with accuracy over the exposure opening 23. The plunger 51 may be depressed at this operation to illuminate the film from beneath. It will be understood that with the set screws 26 loosened such adjustment of the negative film will likewise cause adjustment of the extension 25 with respect to the slide 19. When the image has been properly adjusted over the exposure opening the set screws 26 are tightened, thus locking the extension 25 to the slide 19 whereby upon each subsequent reciprocation of the slide the negative film will be moved exactly the same distance each time to bring the frames or images on the negative film properly over the exposure opening. It will be necessary to make this adjustment only once for each strip of negative film inasmuch as there will be little, if any, variation between the relative positions of the images and the perforations on a given strip. If a different negative strip be used, however, which strip was possibly exposed in a camera other than that which exposed the first strip, it may be necessary to make a second adjustment of the extension 25, carrying the lower claw, for such strip.

With the negative film now threaded through the slide and with the first image thereon to be printed properly adjusted with respect to the exposure opening, the free end of the positive film is now pulled downwardly from the film magazine and fed first through the film guide 33 and then over the film guide 31 and under the teeth 38 of the claw 37 from whence it is passed under the guide 45 directly over the negative film at the point overlying the exposure opening. The films are now ready for printing this first image or frame and the slide 19 may now be moved upwardly by means of the handle member 48, to the position shown in Figure 3, the film strips, of course, not being disturbed during this movement as the claws slide idly over the perforations in this direction. When the upward limit of movement of the slide is reached the operator depresses the handle member 48 which first brings the presser pad 50 into engagement with the film strips directly over the exposure opening, and continued downward pressure results in depressing, by means of the handle 48, the plunger 51, thus closing the contact 42 and lighting the printing lamp 4 within the casing. When sufficient exposure has been given, the light from lamp 4 passing through the window 24 and through the negative image onto the positive film, the operator relieves the pressure on handle 48 thus permitting the same to rise and break the contact to the lamp and also relieve the pressure of pad 50 on the films. The slide 19 is now pulled downwardly by the handle 48, the result being to move together both strips of film through the claw members 37 and 42. The position of the upper or positive claw member 37 is, of course, so arranged in the course of manufacture with respect to the exposure opening as to move the positive film the exact distance required to present a new unexposed section of the film for exposure when the slide is moved from its uppermost position to its lowermost, such positions being determined by the stop members 53 and 55. Likewise the lower or negative claw 42 after having been adjusted as above described during the proper framing of the negative image, will move the negative film the proper distance for presenting the next negative image over the exposure opening for printing.

The printing operations just described may be continued, the operator first pulling the slide downwardly to shift the strips then moving the slide upwardly and then depressing the handle 48 to make the exposure and repeating the operation. It sometimes occurs that due to improper shifting of the negative film in the camera where it is being exposed, some of the negative images may be improperly spaced with respect to each other or even overlapping one another. In such event, it may be desirable to print one or more of such improperly spaced frames or images on the positive film in proper position with respect to the other frames printed thereon. In this connection it should be borne in mind that the frames or images printed on the positive film must all be uniformly spaced in order to eliminate unnecessary adjustment or framing of the positive film after development, in the projector. Means are therefore provided for thus making the necessary adjustments of the negative film relative to the positive film and independent of the negative claw member 42 whereby to properly frame an image which may be out of regular position. If it is necessary to move the negative film further downwardly or to the left in Figure 3 for such adjustment, the end of the negative film projecting out of the slide may be grasped by the operator and the film pulled to the left in Figure 3 the necessary amount for the adjustment, in such case the film merely riding over the teeth 43 of the negative claw 42. If, however, after the shifting of the films by the slide member it is found that negative film must be moved back or upwardly a slight distance to properly frame the image the teeth 43 of the claw 42 must be moved out of engagement of the perforations of the film in order to permit such movement of the film. For this purpose there is pivoted at 57 an arm, one end 58 of which rests upon the top of the claw 42 and the opposite end 59 of which extends rearwardly and beyond the extension 25. Suitably pivoted to the fixed extension 20 as at 60, is a lever 61, the inner end 62 of which underlies the extended arm 59. The outer end of the lever 61 provides a finger piece 63 for rocking such lever on its pivot to raise the end 59 of the arm, thus depressing the end 58 thereof and forcing the teeth 43 out of engagement with the perforations of the film. During such disengagement the negative film may be moved to the right in Figure 3 without interference from the claw 42. Releasing the finger piece 63 of the lever 61 allows the end 58 of the arm to return to normal position under the influence of the spring 44, urging the claw 42 upwardly. Therefore upon the next reciprocation of the slide member 19 the claw 42 will engage with the next set of perforations of the negative film and move the same as before described.

Attention should be called to the fact here that any one or more of the images on the negative film may, if desired, be omitted entirely from the positive strip simply by pulling the negative film downwardly through the slide independently of the claw 42 until the next frame or image to be printed registers properly with the exposure opening.

Figure 7:
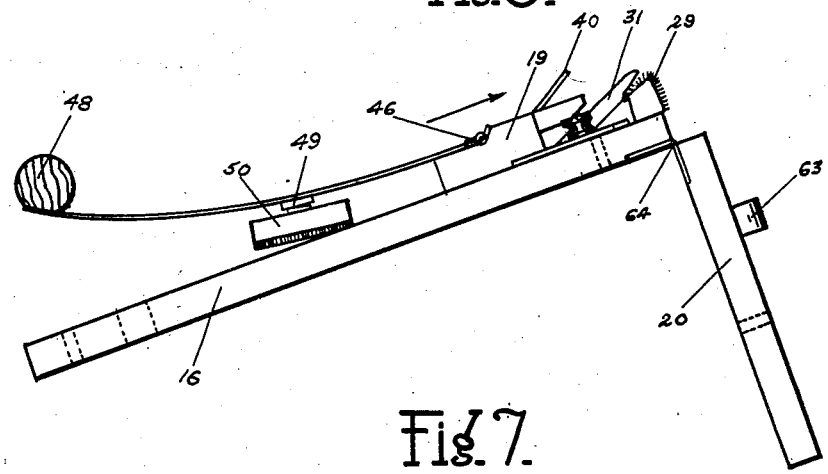
Figure 7 is a detailed view illustrating the means for assembling or dismantling the film shifting device.

If for any reason it is desired to dismantle the printer this may be done by removing the films from the slide and claws and removing the screws 15 and 21, whereupon the guide member 16 and its extension 20 may be lifted off the section 2 of the case. The extension 20 may then be hinged downwardly at the point of hinged connection 64, as shown clearly in Figure 7 whereupon the slide 19 with its extension 25 may be slid out of the guide member without interference with the film guides and lever 61 carried by the extension 20.

It will thus be seen that I have by my invention provided a printing apparatus particularly designed for the printing of strips of positive film for use in projection machines, the negative film from which the images are printed being adjustable so that accurate arrangement of the positive images is assured.

Of course, many changes may be made in the details of construction and operation without departing from the spirit and scope of my invention. I do not limit myself therefore to the exact details herein shown and described other than by the appended claims.

I claim:

1. A photographic printer comprising a printing light and exposure station, means for moving a negative strip and a positive strip to position over said station, said means including separate shifters for so moving each of said strips, and said shifters being adjustably secured together for simultaneously moving said strips.

2. A photographic printer comprising a printing light and exposure station, a single means for moving a negative strip and a positive strip to position over said station, said means carrying a separate shifter for each strip, said shifters being adjustably secured together.

3. A photographic printer comprising a printing light and exposure station, means for moving a negative strip and a positive strip to position over said station, comprising independent shifters for said strips adjustably secured together for simultaneous movement, said shifters being disengageable from said strips whereby said strips may be adjusted independently of each other and of said shifters in said printer.

4. A photographic printer comprising a printing light and exposure station, means for moving a negative strip and a positive strip to position over said station, and separate shifters on said means for engaging said strips, adjustably secured together, said strips being separated at the points of engagement with said shifters and in contact with each other at said exposure station.

5. A photographic printer comprising a printing light and exposure station, means for moving a negative strip and a positive strip to position over said station, comprising a reciprocating slide movable between fixed stops on said printer, and independent shifters on said slide, one normally engaging each of said strips.

6. A photographic printer comprising a printing light and exposure station, means for moving a negative strip and a positive strip to position over said station, comprising a reciprocating slide movable between fixed stops on said printer, independent shifters on said slide, one normally engaging each of said strips, said shifters being relatively adjustable with respect to each other, and means for manually disengaging one or both of said shifters from said strips.

7. A photographic printer comprising a printing light and exposure station, means for moving a negative strip and a positive strip to position over said station, comprising a reciprocating slide movable between fixed stops on said printer, means for actuating said slide including a control for said printing light and a means for holding said strips in contact with each other at said exposure station.

JOHN J. RISDON.